US 6,649,263 B2

(12) United States Patent
Tam et al.

(10) Patent No.: US 6,649,263 B2
(45) Date of Patent: Nov. 18, 2003

(54) POLYESTER RESIN AND INDUSTRIAL YARN PROCESS

(75) Inventors: Thomas Y-T. Tam, Richmond, VA (US); Samir Z. Abdalla, Midlothian, VA (US); James G. Neal, Raleigh, NC (US); John A. Young, Midlothian, VA (US); Hong-Jian J. Sha, Chester, VA (US); Hu Zhixuan, Guangdong (CN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/991,179

(22) Filed: Nov. 16, 2001

(65) Prior Publication Data
US 2003/0104203 A1 Jun. 5, 2003

(51) Int. Cl.[7] .................. D02G 3/00; C08G 63/52
(52) U.S. Cl. .................. 428/364; 528/272; 528/308.1; 528/308.3; 528/308.6; 264/210.7; 264/210.8; 264/211.12
(58) Field of Search .................. 528/272, 308.1, 528/308.3, 308.6; 264/210.7, 210.8, 211.12; 428/364

(56) References Cited

U.S. PATENT DOCUMENTS

| 2,465,319 A | | 3/1949 | Whinfield et al. ............ 260/75 |
| 3,050,533 A | | 8/1962 | Munri et al. ............ 260/346.1 |
| 3,390,135 A | | 6/1968 | Seiner .................. 260/75 |
| 3,431,243 A | | 3/1969 | Uno et al. ................ 250/75 |
| 3,590,072 A | | 6/1971 | Leybourne, III ............ 260/475 |
| 3,655,729 A | | 4/1972 | Rinehart .................. 260/475 |
| 3,679,741 A | * | 7/1972 | Burress et al. ............ 562/487 |
| 3,689,461 A | | 9/1972 | Balint et al. ............ 260/75 M |
| 3,697,579 A | | 10/1972 | Balint et al. ............ 260/468 R |
| 3,842,041 A | | 10/1974 | Browne et al. ............ 260/75 M |
| 3,887,612 A | * | 6/1975 | Shigeyasu et al. ............ 562/414 |
| 3,892,798 A | | 7/1975 | Heeg et al. ............ 260/475 P |
| 4,001,187 A | | 1/1977 | Itabashi et al. ............ 260/75 M |
| 4,039,515 A | | 8/1977 | Rebhan et al. ............ 260/75 M |
| 4,077,945 A | | 3/1978 | Heinze et al. ............ 260/75 M |
| 4,096,124 A | | 6/1978 | Wu et al. ............ 260/75 M |
| 4,100,142 A | | 7/1978 | Schaefer et al. ............ 526/68 |
| 4,110,316 A | | 8/1978 | Edging et al. ............ 526/68 |
| 4,212,991 A | * | 7/1980 | Choulet et al. ............ 562/480 |
| 4,334,090 A | | 6/1982 | Donaldson ............ 562/480 |
| 4,382,139 A | | 5/1983 | Kapteina et al. ............ 528/502 |
| 4,629,715 A | * | 12/1986 | Schroeder ............ 502/185 |

(List continued on next page.)

FOREIGN PATENT DOCUMENTS

| DE | 2 023 709 | 11/1970 |
| GB | 1 296 242 | 11/1972 |
| GB | 1 387 759 | 3/1975 |
| JP | 521265498 | 10/1977 |
| JP | 56050731 | 12/1981 |
| JP | 3071556 | 7/2000 |

OTHER PUBLICATIONS

Hummel et al., "Continuous Preparation of Polyester Fibers from Dimethyl Terepthalate or Pure Terephthalic Acid", Chem. Ind., 21, 251–4 (1969).
Enka tecnica, "Technical Data—Fraytec II", Akzo Nobel Faser AG Business Unit Enka Tecnica, Heinsberg, Germany, Jun. 1994.

Primary Examiner—Samuel A. Acquah
(74) Attorney, Agent, or Firm—Virginia Szigeti

(57) ABSTRACT

A polyester resin, a method for its preparation, the polyester prepared by the method, a method for manufacturing therefrom at increased productivity a dimensionally stable polyester yarn having a low fray count, and the yarn thereby produced. The polyester resin is prepared from high purity terephthalic acid having a particle size distribution described by a Weibull function with narrow ranges of characteristic size and shape factor. The polyester resin has a low filter-blinding index. The polyester yarn is useful for tires, industrial products and other applications.

19 Claims, 9 Drawing Sheets

U.S. PATENT DOCUMENTS

| | | | |
|---|---|---|---|
| 4,851,172 A | 7/1989 | Rowan et al. | 264/130 |
| 4,867,936 A | 9/1989 | Buyalos et al. | 264/210.6 |
| 4,892,972 A * | 1/1990 | Schroeder et al. | 502/185 |
| 4,975,326 A | 12/1990 | Buyalos et al. | 428/373 |
| 5,067,538 A | 11/1991 | Nelson et al. | 152/451 |
| 5,234,764 A | 8/1993 | Nelson et al. | 428/364 |
| 5,266,255 A | 11/1993 | Gibbon et al. | 264/210.7 |
| 5,567,842 A * | 10/1996 | Izumisawa et al. | 562/486 |
| 5,630,976 A | 5/1997 | Nelson et al. | 264/210.8 |
| 5,741,587 A | 4/1998 | Bennie et al. | 428/365 |
| 5,840,968 A | 11/1998 | Lee et al. | 562/486 |
| 6,034,269 A | 3/2000 | Turner et al. | 562/412 |
| 6,287,688 B1 | 9/2001 | Howell et al. | 428/364 |

* cited by examiner

POLYESTER RESIN AND INDUSTRIAL YARN PROCESS

BACKGROUND OF THE INVENTION

1. Field of the Invention

The present invention is a polyester resin, a method for its preparation, a method for manufacturing at increased productivity therefrom a dimensionally stable polyester yarn having a low fray count, and the yarn thereby produced. The polyester resin is prepared from high purity terephthalic acid having a particle size distribution described by a Weibull function with narrow ranges of characteristic size and shape factor. The polyester yarn is useful for tires, industrial products and other applications.

2. Description of the Related Art

The production of polyester yarns is a continually evolving art. Global competition generates need for higher productivity processes and superior products. These needs are particularly manifested in the area of reinforcing yarns for automotive tires where trends toward larger vehicles and greater highway speeds present challenges to tire design and manufacture.

The preparation of linear polyesters by direct polymerization of terephthalic acid and glycols is well known. The prototypical polyester is poly(ethylene terephthalate) although other polyesters are both known and useful. Both batch and continuous processes for direct polymerization have been described. Batch processes have been described for example in U.S. Pat. No. 2,465,319 to Whinfield et al.; U.S. Pat. No. 3,050,533 to Munro et al.; U.S. Pat. No. 3,842,041 to Browne et al.; U.S. Pat. No. 4,077,945 to Heinze et al.; British Patent GB 1,387,759 to Browne et. al.; and Japanese Patents JP 56050731 B4 to Kamatani et al.; and JP 52126498 A2 to Murada et al.

Continuous processes have been described for example in U.S. Pat. No. 3,390,135 to Seiner; U.S. Pat. No. 3,590,072 to Leybourne III; U.S. Pat. No. 3,655,729 to Rinehart; U.S. Pat. No. 3,689,461 and U.S. Pat. No. 3,697,579 to Balint et al.; U.S. Pat. No. 3,892,798 to Heeg et al.; U.S. Pat. No. 4,001,187 to Itabashi et al.; U.S. Pat. No. 4,039,515 to Rebhan et al.; U.S. Pat. No. 4,096,124 to Wu et al.; U.S. Pat. No. 4,100,142 to Schaefer et al.; U.S. Pat. No. 4,110,316 to Edging et al.; U.S. Pat. No. 4,382,139 to Kapteina et al.; and British Patent GB 1,296,242. The publication by Hummel et al., "Continuous Preparation of Polyester Fibers from Dimethyl Terepthalate or Pure Terephthalic Acid", *Chem. Ind.*, 21, 251–4 (1969) describes a continuous polyester process with direct spinning.

In a typical direct polymerization process, terephthalic acid and glycol are mixed together and fed to a reactor as a slurry or a paste. The particle size and/or the particle size distribution of the terephthalic acid has been given repeated consideration for its effect on the viscosity of the terephthalic acid/glycol slurry or paste. Low slurry/paste viscosities are preferred but widely divergent methods have been employed to achieve this objective with equally divergent conclusions. In what follows, the terms micrometers and microns (symbol: $\mu$) will be understood to be the same unit, namely one-millionth of a meter.

U.S. Pat. No. 3,431,243 to Uno et al. teaches compressing terephthalic acid to produce particles not more than 8 mm (8000 micrometers) in size.

U.S. Pat. No. 3,655,729 to Rinehart teaches use of terephthalic acid having from 40 to 90 wt % of particles larger than 420 microns but smaller than 869 microns and from 10 to 60 wt. % of particles smaller than 420 microns of which the major portion is smaller than 149 microns.

U.S. Pat. No. 4,100,142 to Schaefer et al. teaches use of terephthalic acid particles having a normal distribution of sizes within the range 15 to 50 microns and having particles larger than 100 microns removed by screening. Alternatively, a bi-modal distribution is described with a major peak in the range of 7 to 15 microns and a minor peak in the range of 80 to 120 microns.

U.S. Pat. No. 4,382,139 to Kapteina et al. teaches use of terephthalic acid crushed into very fine particles in the molecular disperse size range.

U.S. Pat. No. 4,334,090 to Donaldson teaches attrition of terephthalic acid crystals before forming a slurry. No particular particle size range is specified.

Japanese Patent JP 3071556 B2 to Nakoa et al. teaches terephthalic acid particle sizes less than 100 micron.

Japanese Patent JP 52126498 A2 to Murada et al. teaches terephthalic acid particles with a Stokes diameter uniformity less than 1.6. Examples of the invention included median particle sizes from 63 to 95 microns. Comparative examples ranged in median particle size from 71 to 145 microns.

Japanese Patent JP 56050731 B4 to Kamatani et al. teaches a terephthalic acid median particle size less than 300 microns with less than 20 wt % of particles larger than 500 microns. Examples of the invention included median particle sizes from 25 to 250 microns with 0.5 to 10 wt % of particles larger than 500 microns. Comparative examples ranged in median particle size from 50 to 100 microns with 1 to 6 wt % of particles larger than 500 microns.

German Patent DE 2 023 709 to Leybourne teaches a terephthalic acid particle size distribution such that at least 10% of the particles are retained on a 165–297 micron screen and at least 10% pass through 63 micron screen.

However, of this group of patents in which terephthalic acid particle size has been considered, only one, U.S. Pat. No. 4,100,142 describes polyester of fiber forming quality and high molecular weight, i.e., intrinsic viscosity greater than 0.8. Moreover, no connection has heretofore been made between the particle size distribution of the terephthalic acid employed in forming a polyester, and the productivity of the process of preparing a yarn from that polyester.

Processes for the preparation of polyester yarns have been described for example in U.S. Pat. Nos. 4,851,172 to Rowan et al.; U.S. Pat. Nos. 4,867,936 and 4,975,326 to Buyalos et al.; U.S. Pat. Nos. 5,067,538, 5,234,764 and 5,630,976 to Nelson et al.; U.S. Pat. No. 5,266,255 to Gibbon et al.; U.S. Pat. No. 5,741,587 to Bennie et al.; and U.S. Pat. No. 6,287,688 to Howell et al. U.S. Pat. Nos. 5,067,538, 5,234,764, and 5,630,976 disclosing dimensionally stable polyester yarns are particularly relevant to the present invention and are hereby incorporated herein by reference to the extent not incompatible herewith.

Dimensionally stable polyester yarns are prepared by spinning high molecular weight polyester of intrinsic viscosity at least about 0.8 under high stress conditions and then hot drawing to near the breaking point. During spinning and drawing at high stress, it is not uncommon for individual filaments in a yarn bundle to break forming "slubs" or "frays". Frays are obviously undesirable but not necessarily fatal to the use of the yarn so long as the tensile strength of the yarn bundle is maintained within stringent standards. However, when the number of frays is excessive, then stringent yarn tensile specifications cannot be met, product is scrapped, and productivity falls. Indeed, when the number of frays is excessive, the yarn may completely break in the spinning or drawing operation. This necessitates re-stringing the line with attendant and costly downtime. A need exists to identify and to eliminate, to the degree possible, all sources of frays. This has been a long felt but unsatisfied need, although the means for its amelioration have long been available.

SUMMARY OF THE INVENTION

The invention provides a polyester resin, a method for its preparation, the polyester resin prepared by the method of the invention, a method of manufacturing therefrom a dimensionally stable, high molecular weight polyester yarn at increased productivity and reduced fray count, and the yarn thereby produced.

The polyester resin has an intrinsic viscosity of at least about 0.8 dl/g measured in a 60/40 (w/w) mixture of phenol/tetrachloroethane at 25° C. and has a filter-blinding index less than about 10,000 Pa-cm$^2$/g measured at a throughput of 1.25 g/min of melt flow per cm$^2$ of filter area for 244 minutes at 300° C. through a 128×905 mesh/cm twilled Dutch weave screen having apertures less than 8 microns in dimension.

The method of preparing the polyester resin comprises the steps of: selecting a high purity terephthalic acid having a particle size distribution described by a Weibull function with an index of determination of 0.990 or greater, said distribution having a characteristic size from about 100 to about 140 micrometers and a shape factor from about 1.5 to about 2.1; reacting the terephthalic acid with a glycol and polymerizing to form a linear polyester having an intrinsic viscosity of at least about 0.8 dl/g measured in a 60/40 (w/w) mixture of phenol/tetrachloroethane at 25° C.

The invention also includes as an embodiment the polyester resin prepared by the method of the invention.

The method of manufacturing the dimensionally stable polyester yarn comprises the steps of: selecting a high purity terephthalic acid having a particle size distribution described by a Weibull function with an index of determination of 0.990 or greater, said distribution having a characteristic size from about 100 to about 140 micrometers and a shape factor from about 1.5 to about 2.1; reacting the terephthalic acid with a glycol and polymerizing to form a linear polyester having an intrinsic viscosity of at least about 0.8 dl/g measured in a 60/40 (w/w) mixture of phenol/tetrachloroethane at 25° C.; extruding the polyester through a shaped extrusion orifice having a plurality of openings to form a molten spun yarn; withdrawing and solidifying the molten spun yarn at sufficient speed to form a crystalline, partially oriented yarn; and hot drawing the yarn to a total draw ratio of about 1.5:1 to about 3:1.

The invention also includes as an embodiment the dimensionally stable yarn prepared by the method of the invention. The yarn of the invention is useful for tires, industrial products and other applications.

Figure 1:
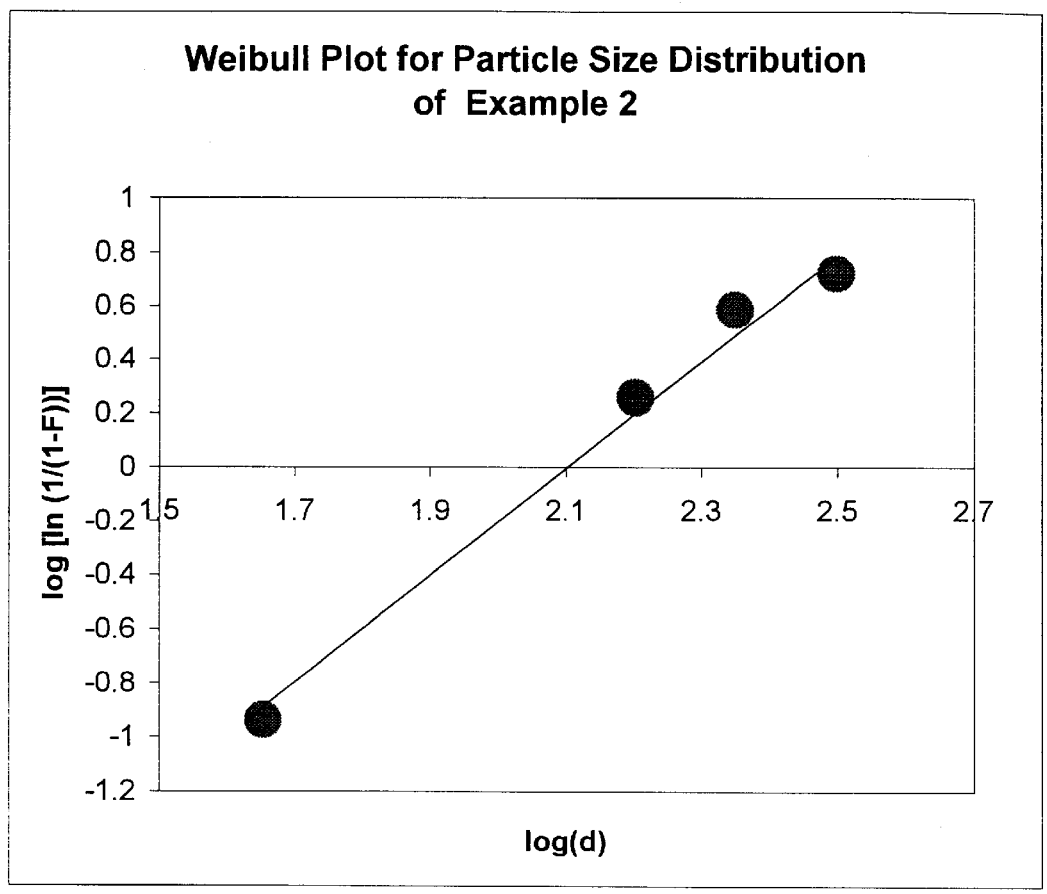
FIG. 1 is a Weibull plot of the particle size distribution of one terephthalic acid of the invention.

In each of the figures, the data represented by the circles are examples of the invention. The data represented by the squares are comparative examples.

DETAILED DESCRIPTION OF THE INVENTION

The present invention is a polyester resin, a method for its preparation, a method for manufacturing at increased productivity therefrom a dimensionally stable polyester yarn having a low fray count, and the yarn thereby produced.

In one embodiment, the invention is a polyester resin having an intrinsic viscosity of at least about 0.8 dl/g measured in a 60/40 (w/w) mixture of phenol/tetrachloroethane at 25° C. and having a filter-blinding index less than about 10,000 Pa-cm$^2$/g measured at a throughput of 1.25 g/min of melt flow per cm$^2$ of filter area for 244 minutes at 300° C. through a 128×905 mesh/cm twilled Dutch weave screen having apertures less than 8 microns in dimension. The polyester resin may be a homopolymer or a copolymer. Preferably the polyester resin is comprised of poly(ethylene terephthalate).

In a second embodiment, the invention is a method of preparing a polyester resin comprising the steps of: selecting a high purity terephthalic acid having a particle size distribution described by a Weibull function with a index of determination of 0.990 or greater, said distribution having a characteristic size from about 100 to about 140 micrometers and a shape factor from about 1.5 to about 2.1; reacting the terephthalic acid with a glycol and polymerizing to form a linear polyester having an intrinsic viscosity of at least about 0.8 dl/g measured in a 60/40 (w/w) mixture of phenol/tetrachloroethane at 25° C.

The invention also includes the polyester resin prepared by the method of the invention. In this embodiment, the polyester resin having an intrinsic viscosity of at least about 0.8 dl/g measured in a 60/40 (w/w) mixture of phenol/tetrachloroethane at 25° C. and having a filter-blinding index less than about 10,000 Pa-cm$^2$/g measured at a throughput of 1.25 g/min of melt flow per cm$^2$ of filter area for 244 minutes at 300° C. through a 128×905 mesh/cm twilled Dutch weave screen having apertures less than 8 microns in dimension is prepared by the process comprising the steps of: (a) selecting a high purity terephthalic acid having a particle size distribution described by a Weibull function with a index of determination of 0.990 or greater, said distribution having a characteristic size from about 100 to about 140 micrometers and a shape factor from about 1.5 to about 2.1; and (b) reacting the terephthalic acid with a glycol and polymerizing to form a linear polyester having an intrinsic viscosity of at least about 0.8 dl/g measured in a 60/40 (w/w) mixture of phenol/tetrachloroethane at 25° C.

The invention also provides a method of preparing a dimensionally stable, high molecular weight polyester yarn at lower fray count and increased productivity. The method comprises the steps of: selecting a high purity terephthalic acid having a particle size distribution described by a Weibull function with an index of determination of about 0.990 or greater, said distribution having a characteristic size from about 100 to about 140 micrometers and a shape factor from about 1.5 to about 2.1; reacting the terephthalic acid with a glycol and polymerizing to form a linear polyester having an intrinsic viscosity of at least about 0.8 dl/g measured in a 60/40 (w/w) mixture of phenol/tetrachloroethane at 25° C.; extruding the polyester through a shaped extrusion orifice having a plurality of openings to form a molten spun yarn; withdrawing and solidifying the molten spun yarn at sufficient speed to form a crystalline, partially oriented yarn; and hot drawing the yarn to a total draw ratio of about 1.5:1 to about 3:1.

As a separate embodiment, the invention provides a dimensionally stable polyester yarn prepared by the process comprising the steps of: selecting a high purity terephthalic acid having a particle size distribution described by a Weibull function with an index of determination of about 0.990 or greater, said distribution having a characteristic size from about 100 to about 140 micrometers and a shape factor from about 1.5 to about 2.1; reacting the terephthalic acid with a glycol and polymerizing to form a linear polyester having an intrinsic viscosity of at least about 0.8 dl/g measured in a 60/40 (w/w) mixture of phenol/tetrachloroethane at 25° C.; extruding the polyester through a shaped extrusion orifice having a plurality of openings to form a molten spun yarn; withdrawing and solidifying the molten spun yarn at sufficient speed to form a crystalline, partially oriented yarn; and hot drawing the yarn to a total draw ratio of about 1.5:1 to about 3:1.

In the context of this invention, a high purity terephthalic acid is one suitable for the polymerization of a fiber grade polyester of intrinsic viscosity of about 0.8 dl/g or greater. More specifically, a high purity terephthalic acid contains about 25 parts per million or less of 4-carboxybenzaldehyde (4-CBA). Examples of high purity terephthalic acids are sold by Amoco Chemicals, Lisle, Ill. under the tradenames AMOCO® TA-22 and AMOCO® TA-33. Preferably, the high purity terephthalic acid contains less than about 10 parts per million of 4-CBA.

For the purposes of this invention, the particle size distribution of the terephthalic acid is measured by screening through a series of standard sieves described by International Standard ISO 3310-1:1990(E). It is preferred that the sieve series include at least four sieves with sieve openings in the range of 45$\mu$ to 355$\mu$. It is most preferred that the sieve series include at least sieves having opening sizes of 45$\mu$, 160$\mu$, 224$\mu$ and 315$\mu$.

A Weibull distribution of particle sizes is described by the following relationship:

$$F(d) = 1 - e^{-\left(\frac{d}{D}\right)^S}$$

where:
d is the particle size, microns
F(d) is the cumulative weight fraction of particles smaller than d
D is a characteristic size for the distribution, microns S is a shape factor for the distribution, dimensionless F(d) is determined by first the screening the terephthalic acid through a series of standard sieves having progressively smaller aperture sizes and weighing the particles retained on each sieve. The weight fraction of particles retained on a particular sieve is the weight of particles on that particular sieve divided by the total weight of all particles. F(d) is then found by summing all the weight fractions retained on sieves with apertures smaller than d. For a Weibull particle size distribution, a plot of log(d) versus log [ln (1/(1-F))] is a straight line having a slope of 1/S and having an intercept of log(D).

A terephthalic acid particle size distribution of the inventive method has a characteristic size (D) of about 100 to about 140 micrometers and a shape factor (S) from about 1.5 to about 2.1. Preferably, the characteristic size is from about 110 to about 125 micrometers. Preferably, the shape factor of the distribution is from about 1.7 to about 1.9.

For a terephthalic acid of the inventive method, a regression of log(d) versus log [ln(1/(1-F))] has an index of determination of 0.990 or greater. Preferably, the index of determination is about 0.995 or greater. The index of determination of the regression ($R^2$) is defined in the usual way as:

$R^2$=Regression Sum of Squares/Total Sum of Squares

The particle size distribution of the terephthalic acid is critical to the success of the invention. Without being held to a particular theory of why the invention works, it is believed that the terephthalic acid particle size distribution of the invention avoids problems that may occur when the terephthalic acid particles are either too small or too large.

When the terephthalic acid particles are very small, reaction with the glycol is rapid and a high proportion of acid terminated T-G-T ester may form, where T represents a terephthalate moiety (HOOC—$C_6H_4$—CO—) and G represents —O—$(CH_2)_n$—O—. T-G-T esters have very high melting points, e.g., about 360° C. for the T-G-T ester of ethylene glycol. The T-G-T ester is believed to precipitate from the reaction mixture and eventually to degrade to a carbonaceous particulate inclusion in the polyester. If this inclusion is not removed by filtration, a filament spun from the polyester may break at the site of the inclusion.

At the other end of the particle size spectrum, when terephthalic acid particles are too large, esterification with the glycol is slow. Only the outer portions of a large terephthalic acid particle esterify leaving an unreacted core. Eventual degradation of this core again leads to carbonaceous inclusions in the polyester and subsequent filament breakage.

The terephthalic acid particle size distribution of the inventive methods is believed to mitigate both of these problems.

The terephthalic acid particle size distribution of the methods of the invention may be contrasted with those of the prior art where a sieve analysis had been reported. Examples of several particle size distributions were given in U.S. Pat. No. 3,655,729 to Rinehart. Weibull analysis of the Reinhart terephthalic acid particle size distributions yields the following results.

U.S. Pat. No. 3,655,729

EXAMPLE 1

D, Characteristic size–986 microns
S, Shape factor–0.465

EXAMPLE 2

| | Mixture: U = unground; G = ground | | | | |
|---|---|---|---|---|---|
| | 90/10 U/G | 80/20 U/G | 70/30 U/G | 40/60 U/G | 0/100 U/G |
| D, microns | 605 | 345 | 277 | 204 | 167 |
| S | 2.11 | 2.78 | 3.17 | 4.08 | 4.76 |
| $R^2$ | 0.41 | 0.34 | 0.33 | 0.33 | 0.40 |

Examples of several particle size distributions were also reported in German Patent 2,023,709. Weibull analysis of the DE 2,023,709 terephthalic acid particle size distributions yields the following results.
DE 2,023,709

TABLE I

| | Fine | Coarse | 50/50 w/w |
|---|---|---|---|
| D, microns | 37 | 528 | 320 |
| S | 0.95 | 3.2 | 0.37 |
| $R^2$ | 0.98 | 0.92 | 0.97 |

The terephthalic acid particle size distributions of these prior art references are very different from those of the method of the present invention.

High purity terephthalic acid having the requisite particle size distribution for the methods of the invention may be obtained as direct output from a manufacturing process such as one described in U.S. Pat. Nos. 5,770,764, 5,840,968, 6,034,269 or 6,255,525 if appropriate measures are taken to control particle size distribution. Alternatively, the desired particle size distribution may be obtained from an available high purity terephthalic acid with an unsuitable particle size distribution by screening and combining particle size fractions.

The glycol to be reacted with the terephthalic acid is one or more dihydric alcohols selected from the group consisting of ethylene glycol, propylene glycol, butylene glycol and trimethylene glycol. The linear polyester formed by polymerization of the terephthalic acid and the glycol is a linear polyester homopolymer or copolymer. Preferably, the glycol is ethylene glycol and the linear polyester is poly(ethylene terephthalate).

The intrinsic viscosity of the linear polyester formed by polymerization of the terephthalic acid and the glycol is at least about 0.8 dl/g measured in a 60/40 (w/w) mixture of phenol/tetrachloroethane at 25° C. Preferably, the intrinsic viscosity of the polyester is at least about 0.9 dl/g. More preferably, the intrinsic viscosity of the polyester is about 0.95 to about 1.5 dl/g. Most preferably, the intrinsic viscosity of the polyester is about 1.0 to about 1.25 dl/g.

The polymerization step of the methods of the invention may be batch, semi-continuous or continuous. The initial glycol/terephthalic acid ratio in the reaction mixture may be between 1:1 and 3:1. Preferably, the initial glycol/terephthalic acid ratio is between 1.5 and 2.25.

The final polyester intrinsic viscosity of 0.8 dl/g or greater may be achieved in whole or in part by solid state polymerization. Preferably, the polymerization reaction occurs at least in part in the solid state. More preferably the polymerization reaction occurs in at least two stages and the last stage is in the solid state. It is necessary that the polymerization step of the methods of the invention is capable of producing fiber grade linear polyester of intrinsic viscosity of 0.8 dl/g or greater.

The linear polyester of the invention has a filter-blinding index less than about 10,000 Pa-cm$^2$/g. The filter-blinding index is a measure of the number and size of particulate and gel-like inclusions in the polyester. The filter-blinding index is measured by melting the polyester and pumping the polyester melt at 300° C. through a filter consisting of a 128×905 mesh/cm (325×2300 mesh/in.) twilled Dutch weave screen having apertures less than 8 microns in dimension. This fine screen may be supported on one or more coarse screens offering little resistance to flow. The filtration rate is maintained constant at 1.25 g/min of melt flow per cm$^2$ of filter area. The pressure drop across the filter is measured over a period of 244 minutes beginning 10 minutes after the start of melt flow. The filter-blinding index is the increase in pressure drop (Pa) over this period divided by the cumulative melt flow per unit area of the filter (305.2 g/cm$^2$).

To produce a dimensionally stable yarn, a linear polyester of the invention is extruded through a shaped extrusion orifice having a plurality of openings to form a molten spun yarn. The molten spun yarn is withdrawn and solidified at sufficient speed to form a crystalline, partially oriented yarn and hot drawn to a total draw ratio of about 1.5:1 to about 3:1. Preferably, the linear polyester is spun into a dimensionally stable yarn under high stress conditions as described for example in U.S. Pat. Nos. 5,067,538, 5,234,764, or 5,630,976 heretofore incorporated by reference. More preferably, the linear polyester is poly (ethylene terephthalate) and it is spun into a dimensionally stable yarn under the conditions described in U.S. Pat. No. 5,630,976.

The present invention provides dimensionally stable polyester multi-filament yarns suitable as tire reinforcements and other applications at reduced fray count, reduced break index and at higher productivity.

Fray count is typically measured continuously on a running fiber thread line by an opto-electronic sensor located between the final draw roll and the take-up winder. It is preferred that the fray count is measured by the FRAYTEC II device manufactured by Enka tecnica GmbH.

The following examples are presented to provide a more complete understanding of the invention. The specific techniques, conditions, materials, proportions and reported data set forth to illustrate the principles of the invention are exemplary and should not be construed as limiting the scope of the invention.

Tensile properties of the yarns produced were measured by ASTM D2256. Thermal shrinkages of the yarns were measured by ASTM D4974 except that the exposure time to 177° C. was one minute.

EXAMPLES

Comparative Example 1

The particle size distribution of a high purity terephthalic acid having 12.14 parts per million of 4-carboxybenzaldehyde (4-CBA) was determined by screening through a series of standard sieves described by International Standard ISO 3310-1:1990(E). The sieve analysis of the terephthalic acid particles was as follows:

| d, Sieve Aperture, microns | F(d), Wt. % of Particles Smaller Than d |
|---|---|
| 315 | 99.4 |
| 224 | 93.22 |
| 160 | 63.98 |
| 45 | 1.64 |

A regression of log(d) versus log [In(1/(1-F))] had an index of determination ($R^2$) of 0.994. The particle size distribution had a characteristic size (D) of 169 microns and the shape factor (S) was 3.03.

The terephthalic acid was combined with ethylene glycol in a molar ratio of 2:1 ethylene glycol-to-terephthalic acid, and with antimony oxide ($Sb_2O_3$) polycondensation catalyst. The terephthalic acid and ethylene glycol reactants were polymerized in three stages: esterification, polycondensation in the liquid state, and polycondensation in the solid state.

The stages of esterification and polycondensation in the liquid state were continuous coupled processes wherein the reactants flowed through a series of vessels. The esterification stage commenced in a first vessel at a temperature of 260° C. and a pressure of 160 kPa and concluded in a last vessel at a temperature of 275° C. and a pressure of 6 kPa. Excess ethylene glycol was volatilized. Polycondensation in the liquid state commenced in the next succeeding vessel at a temperature of 287° C. and a pressure of 1 kPa and concluded in a last vessel at a temperature of 288° C. and a pressure of 0.1 kPa. Ethylene glycol evolved during the polycondensation was volatilized.

The molten polyester pre-polymer formed was pumped through a strand extrusion die and thence into a water bath to solidify the strands. The cooled strands were chopped into chips by a strand pelletizer. The pre-polymer chips were of 0.65 IV.

The pre-polymer polyester chips were dried and crystallized in air at 160–170° C. followed by polycondensation in the solid state under a stream of nitrogen at 200–220° C. over a period of about 30 hours. At the conclusion of this solid state polycondensation stage, the polyester IV was 1.01.

The 1.01 IV polyester was spun and drawn into a dimensionally stable yarn essentially as described in Example II AD of U.S. Pat. No. 5,630,976 heretofore incorporated by reference. The polymer was extruded through an extrusion die having 391 orifices per thread line to form a molten spun yarn. The spun yarn was withdrawn and solidified at a sufficient speed to form a crystalline partially oriented yarn and then hot drawn in three stages to a total draw ratio of 2.4:1. Thirty pound packages of dimensionally stable yarn were wound up having the following properties:

Dtex–1117

Ultimate tensile strength–6.9 cN/dtex

Ultimate elongation–9.5%

Elongation at 44.5 Newtons–5.0%

Thermal Shrinkage at 177° C.–4.5%

Frays/pkg–2500

Fray counts were measured on-line just before the winder using a FRAYTEC II device manufactured by Enka tecnica GmbH.

Examples and Comparative Examples 2–18

Seventeen additional lots of high purity terephthalic acid were assembled for the following study. Each terephthalic acid lot had a 4-CBA content less than 15 parts per million. Seven lots had a 4-CBA content less than 10 parts per million. The particle size distributions of the several lots were determined by screening through a series of standard sieves described by International Standard ISO 3310-1:1990 (E). Weibull analyses and regression of the particle size distributions as in Example 1 yielded the indices of determination ($R^2$), the characteristic sizes (D) and the shape factors (S) for each terephthalic acid lot as shown in Table I below. FIG. 1 shows a Weibull plot of the particle size distribution for the terephthalic acid of Example 2. The particle size distribution of Example 2 is described by a Weibull function having a characteristic size of 126 microns and a shape factor of 2.04. The index of determination for the regression of the Weibull fit to the particle size distribution of Example 2 is 0.990.

Figure 2:
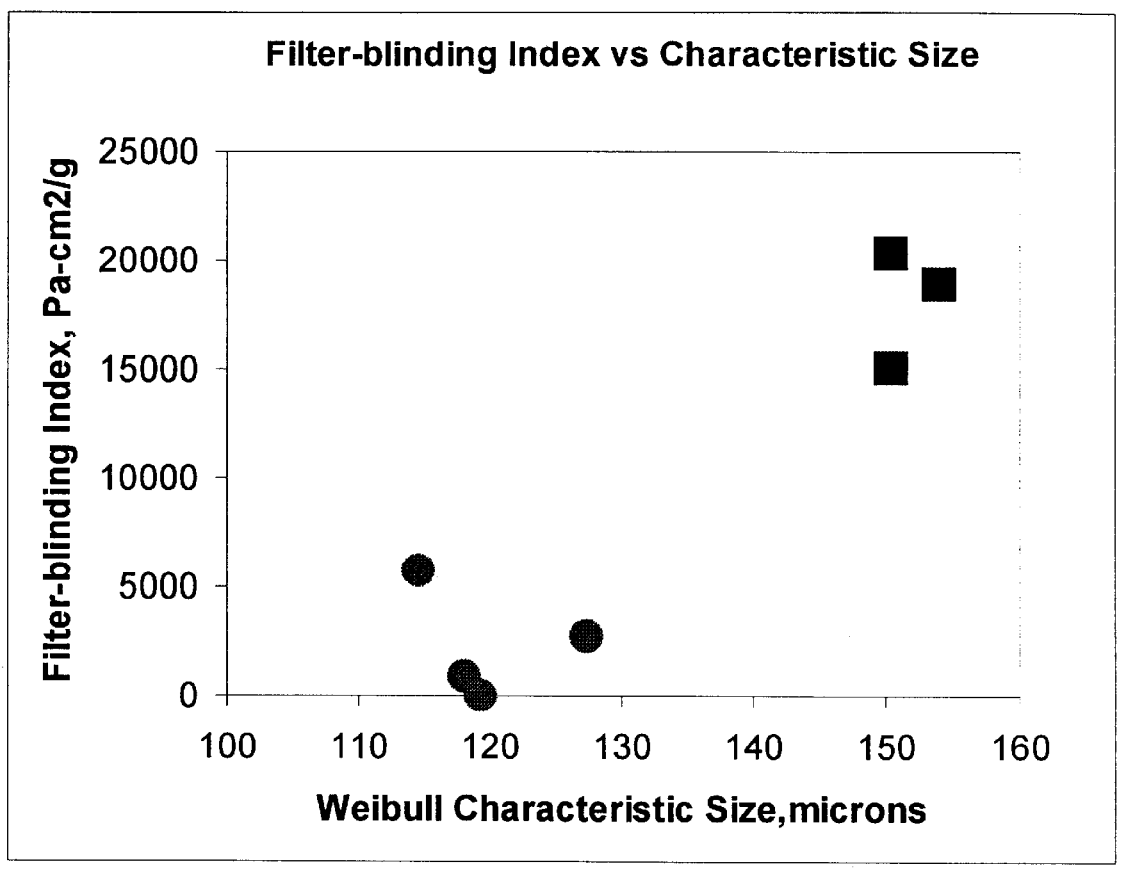
FIG. 2 is a plot of polyester filter-blinding index versus the Weibull characteristic size of the terephthalic acid used to make the polyester.
Figure 3:
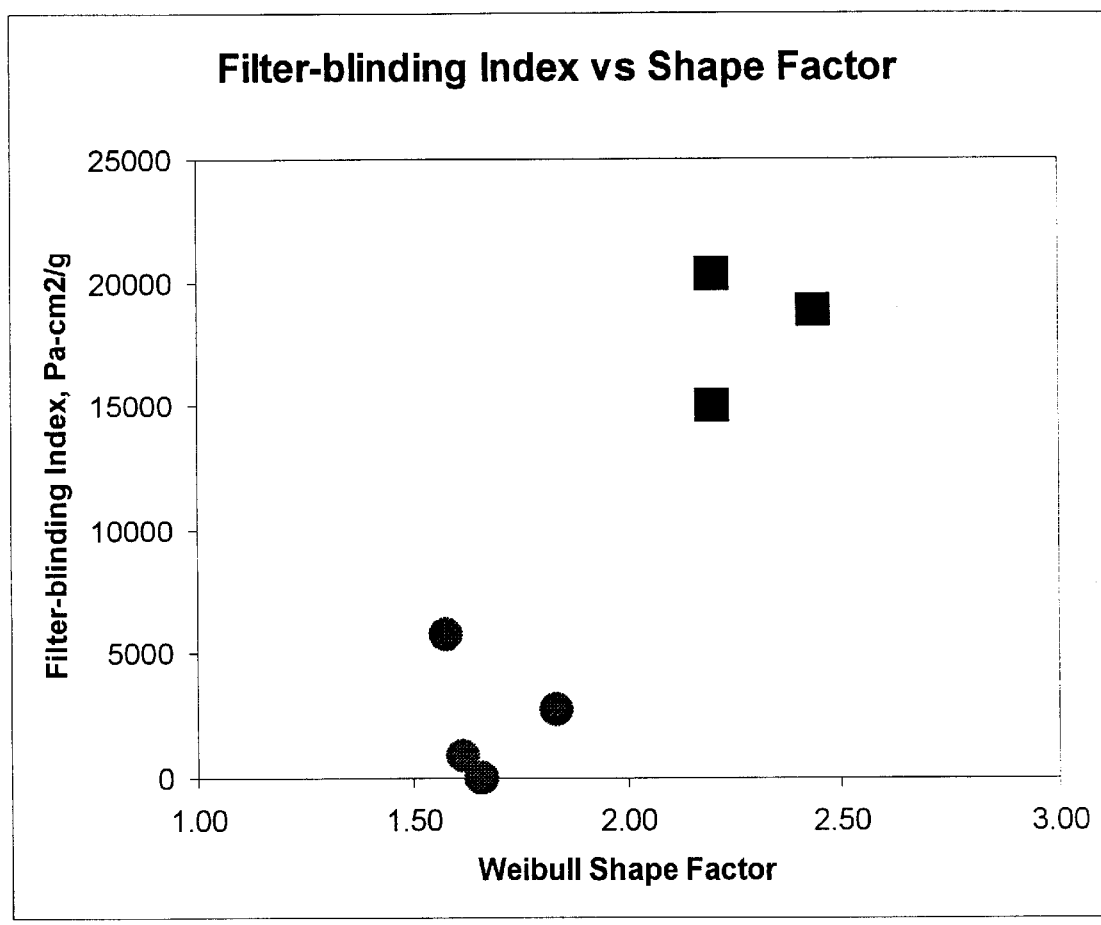
FIG. 3 is a plot of polyester filter-blinding index versus the Weibull shape factor of the terephthalic acid used to make the polyester.

Each lot of terephthalic acid was used to prepare a poly(ethylene terephthalate) polymer lot in the same manner as described in Example 1. All polymer lots had intrinsic viscosities in the range of 1.00 to 1.04 dl/g. The filter-blinding index was determined for the polymer lots of Examples and Comparative Examples 12 to 18 as shown in Table I. The filter-blinding index of the polymer lots produced from each of the terephthalic acid lots of Examples and Comparative Examples 12–18 are plotted versus the corresponding characteristic sizes in FIG. 2 and versus the corresponding shape factors in FIG. 3. It is seen that when the terephthalic acid particle size distribution had a characteristic size of about 100 to about 140 microns and had a shape factor of about 1.5 to about 2.1, the filter-blinding index of the polymer produced therefrom was appreciably reduced. This is a novel and heretofore unexpected result.

The polymers were spun into dimensionally stable yarns in the same manner as Example 1. The properties of the yarns produced from each of the polymer lots were in the following ranges:

Dtex–1095 to 1139

Ultimate tensile strength–6.5 to 7.3 cN/dtex

Ultimate elongation–9.0 to 10.0%

Elongation at 44.5 Newtons–4.5 to 5.5%

Thermal Shrinkage at 177° C.–3.5 to 5.5%

Frays/30 lb. pkg–200 to 3000

The fray counts measured during the spinning of each polymer lot prepared from each terephthalic acid lot are shown in Table I.

Figure 4:
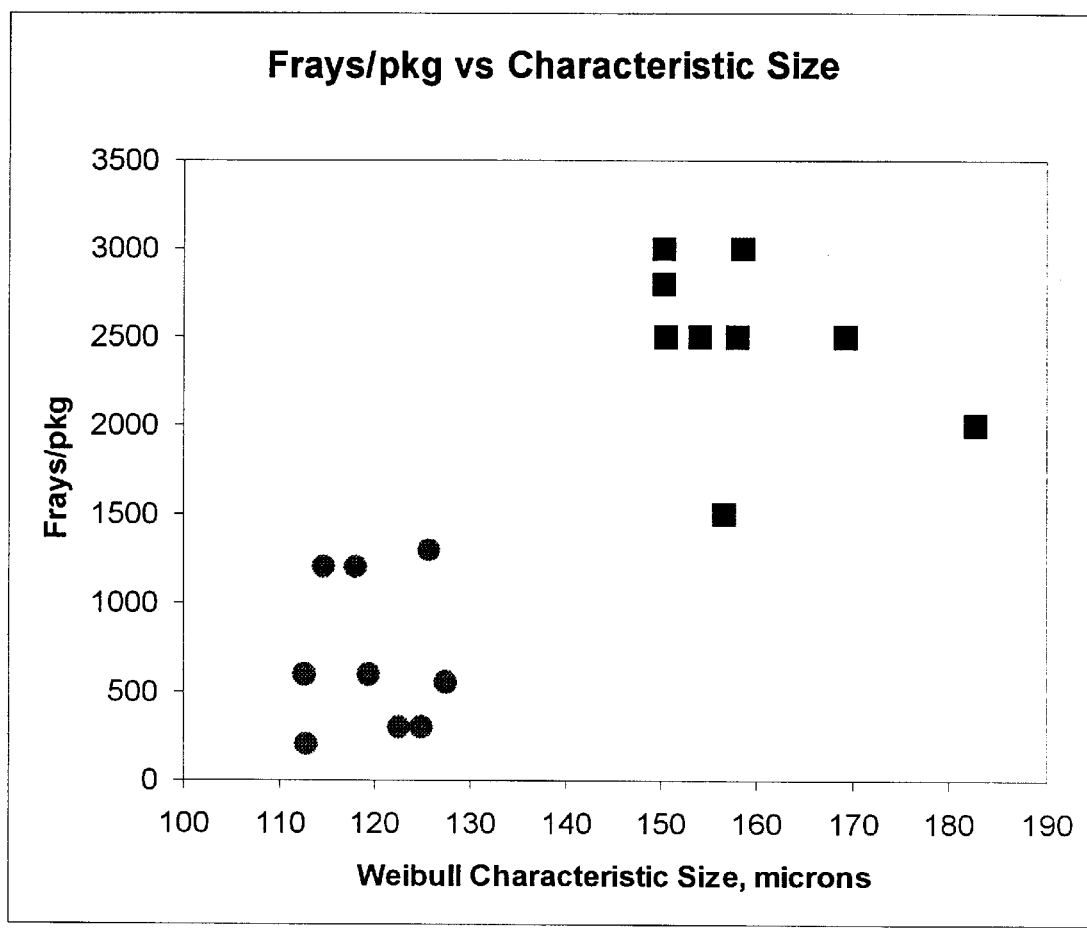
FIG. 4 is a plot of polyester yarn fray frequency versus the Weibull characteristic size of the terephthalic acid used to make the polyester.
Figure 5:
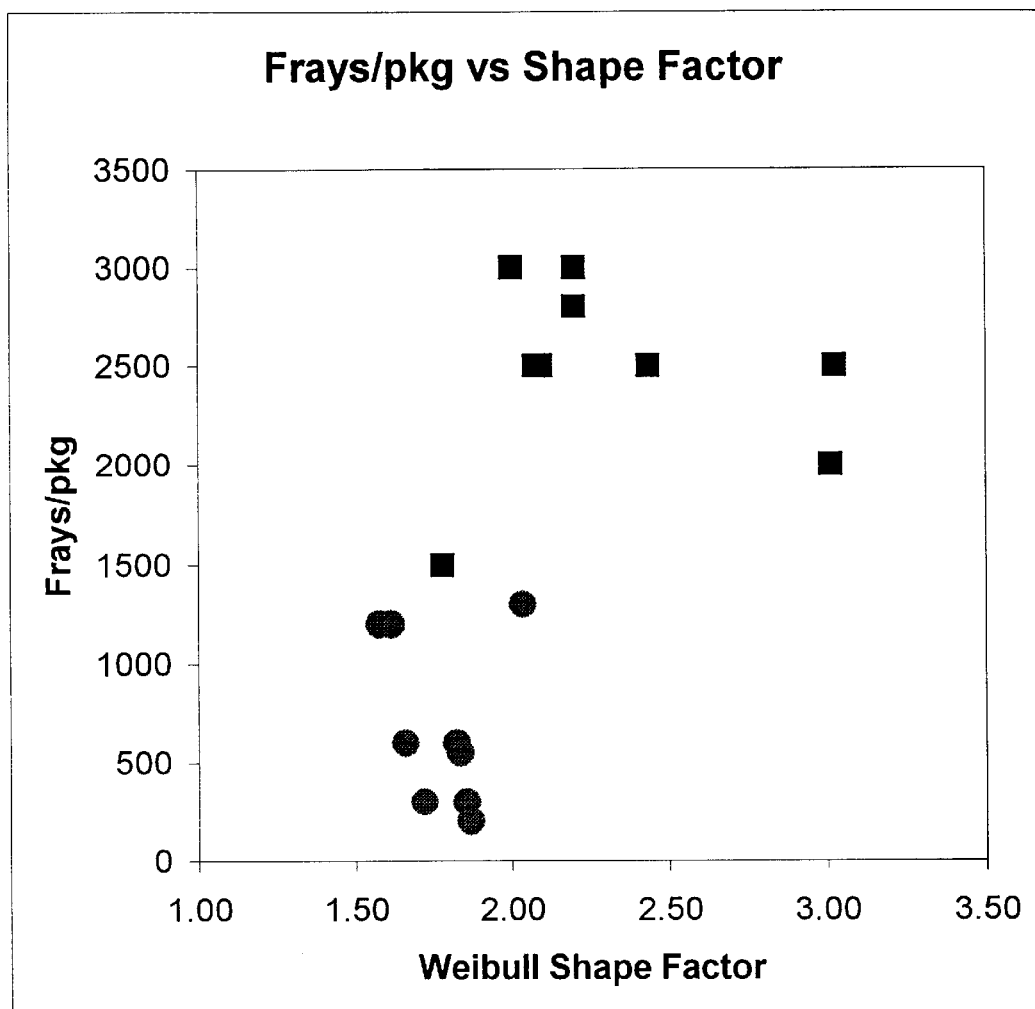
FIG. 5 is a plot of the polyester yarn fray frequency versus the Weibull shape factor of the terephthalic acid used to make the polyester.

The fray counts for the yarns produced from each of the terephthalic acid lots of Examples and Comparative Examples 1–18 are plotted versus the corresponding characteristic sizes in FIG. 4 and versus the corresponding shape factors in FIG. 5. It is seen that when the terephthalic acid particle size distribution had a characteristic size of about 100 to about 140 microns and had a shape factor of about 1.5 to about 2.1, the fray count was appreciably reduced. This is also a novel and heretofore unexpected result.

Figure 6:
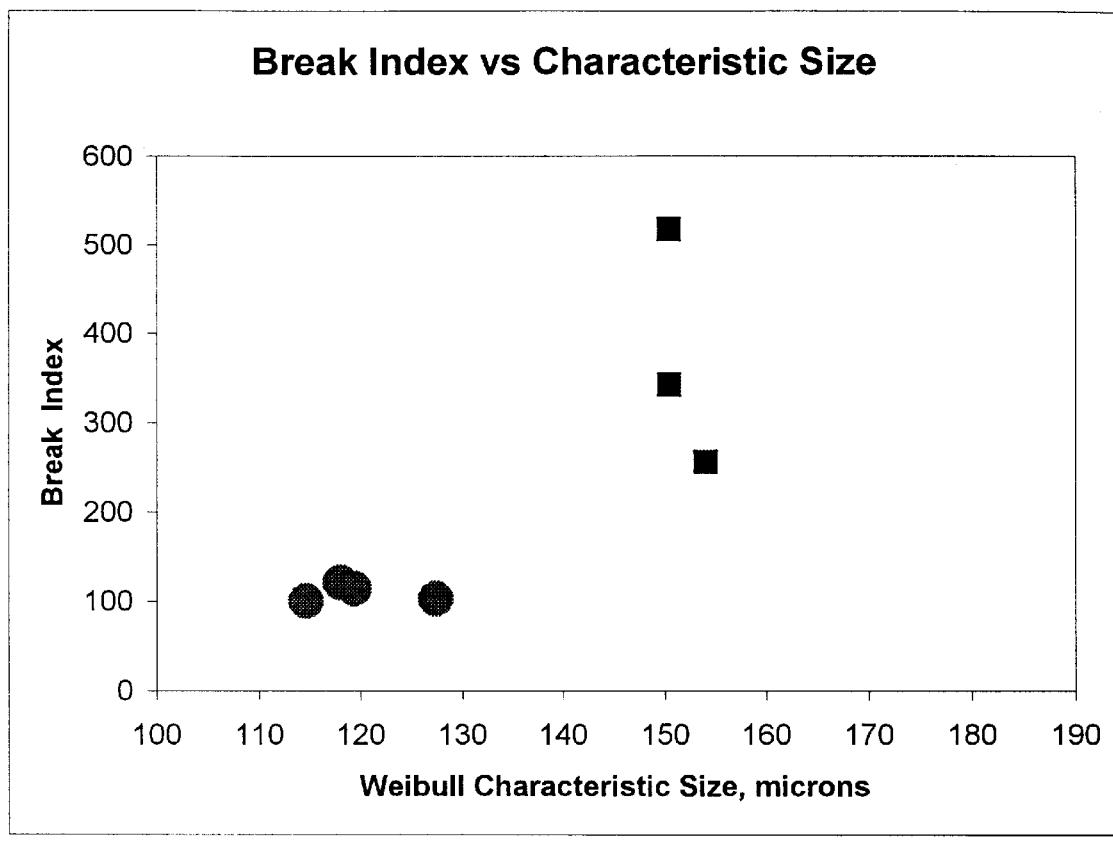
FIG. 6 is a plot of the yarn break index versus the Weibull characteristic size of the terephthalic acid used to make the polyester.
Figure 7:
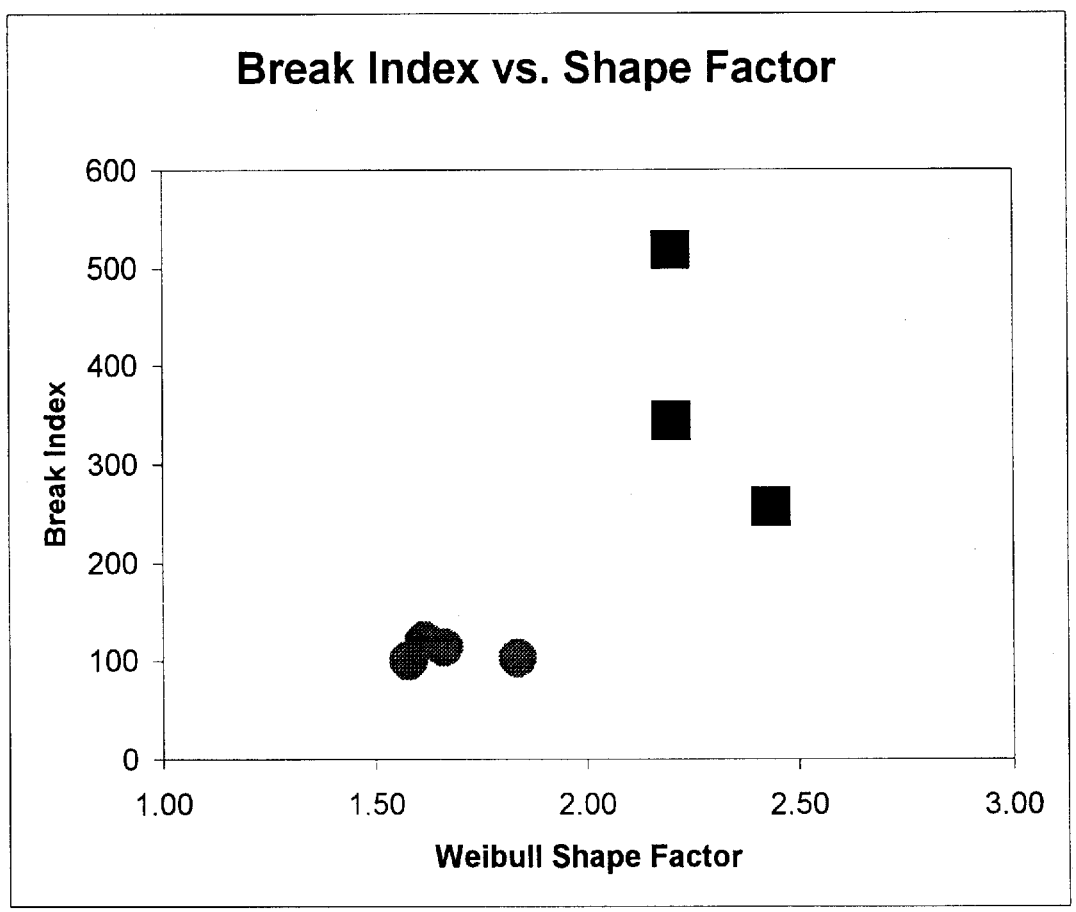
FIG. 7 is a plot of the yarn break index versus the Weibull shape factor of the terephthalic acid used to make the polyester.
Figure 8:
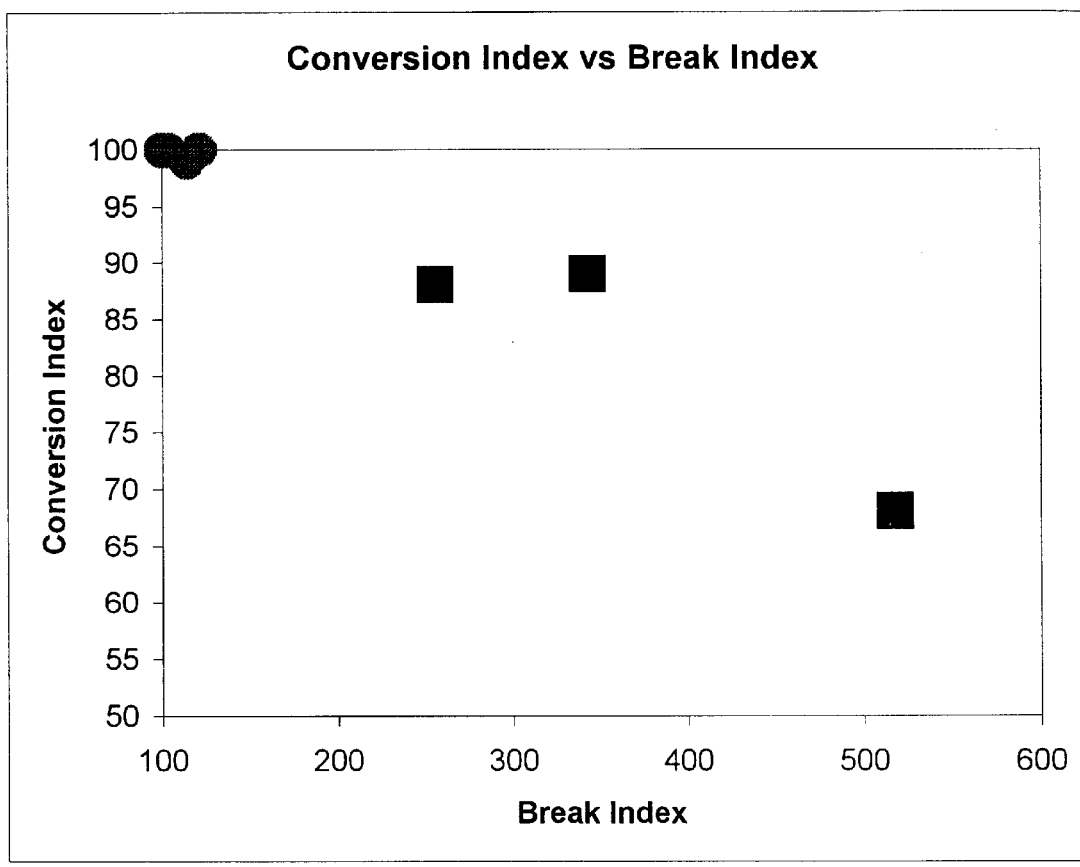
FIG. 8 is a plot of the yarn conversion index versus the yarn break index.

The yarn break frequency and the conversion efficiency from polymer to yarn during the spinning operation was recorded for the yarns prepared from the terephthalic acid lots of Examples and Comparative Examples 12 to 18. When the yarns broke during the spinning/drawing process, it became necessary to restring the line with attendant loss of productivity. Table I shows the relative break frequency (break index) and the relative productivity (conversion index) associated with each of the terephthalic acid lots of Examples and Comparative Examples 12–18. FIGS. 6 and 7 show the break index for these examples plotted versus the terephthalic acid particle size distribution characteristic size and shape factor. FIG. 8 shows the relationship between the break index and the conversion index.

It will be seen that when the terephthalic acid particle size distribution had a characteristic size of about 100 to about 140 microns and had a shape factor of about 1.5 to about 2.1, as in the methods of the invention, the break frequency was appreciably reduced. It will also be seen that when the break frequency was lower, the productivity of the spinning process was higher.

Figure 9:
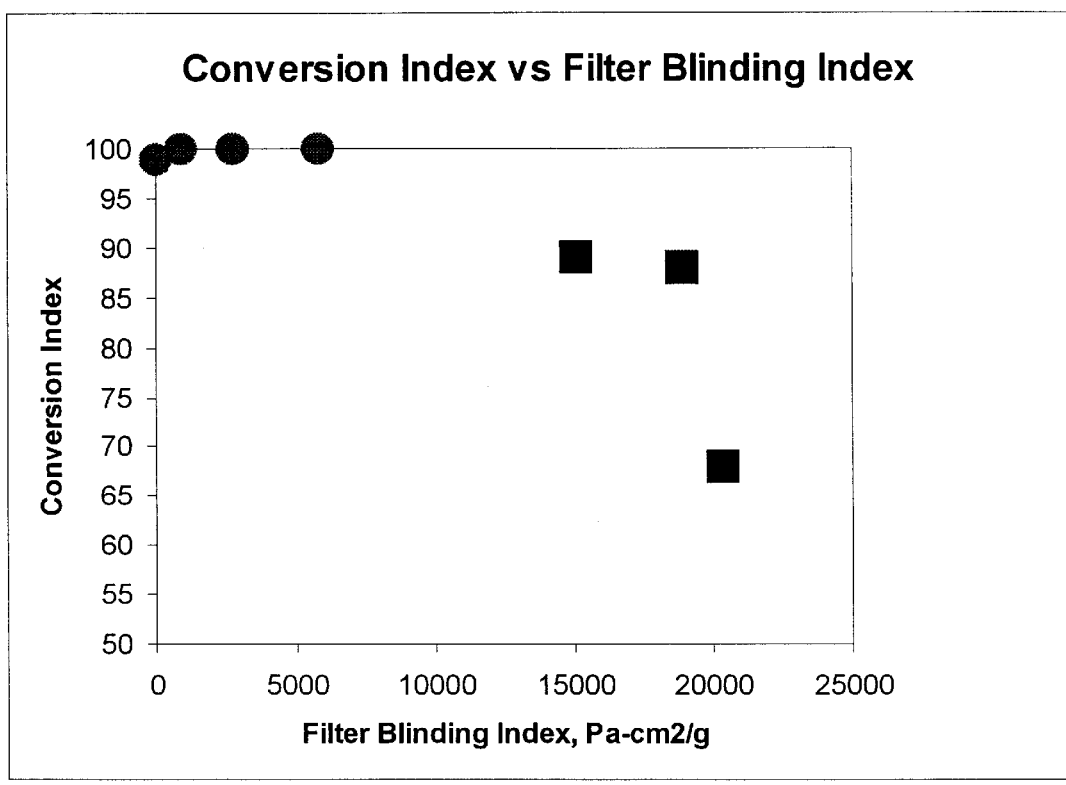
FIG. 9 is a plot of the yarn conversion index versus the filter-blinding index.

FIG. 9 shows the relationship between the filter-blinding index of the polymer lot and the conversion index of the yarn prepared therefrom. It will be seen that when the filter-blinding index of the polymer was less than about 10,000 Pa-$cm^2$/g, the productivity of the spinning process was higher.

Having thus described the invention in rather full detail, it will be understood that such detail need not be strictly adhered to but that further changes and modifications may suggest themselves to one skilled in the art, all falling within the scope of the invention as defined by the subjoined claims.

from about 100 to about 140 micrometers and a shape factor from about 1.5 to about 2.1;

b) reacting the terephthalic acid with a glycol and polymerizing to form a linear polyester having an intrinsic viscosity of at least about 0.8 dl/g measured in a 60/40 (w/w) mixture of phenol/tetrachloroethane at 25° C.;

TABLE I

| Ex. or Comp. Ex. No. | d, Sieve opening size, microns | | | | Weibull Fit to Terephthalic Acid Particle Size Distribution | | | Filter-binding Index | Frays per 30 lb pkg. | Break Index | Conversion Index |
|---|---|---|---|---|---|---|---|---|---|---|---|
| | 45 | 160 | 224 | 315 | $R^2$ | D, microns | S | | | | |
| | F(d), Wt. % of Particles Smaller Than d | | | | | | | | | | |
| 2 | 10.91 | 83.71 | 97.87 | 99.48 | 0.990 | 126 | 2.04 | n.a. | 1300 | n.a.* | n.a. |
| 3 | 7.78 | 65.15 | 90.87 | 99.15 | 0.999 | 151 | 2.10 | n.a. | 2500 | n.a. | n.a. |
| Comp. 4 | 7.26 | 61.66 | 87.50 | 98.70 | 0.999 | 158 | 2.08 | n.a. | 2500 | n.a. | n.a. |
| Comp. 5 | 16.6 | 86.1 | 98.0 | 99.7 | 0.996 | 113 | 1.82 | n.a. | 600 | n.a. | n.a. |
| 6 | 7.98 | 59.92 | 86.7 | 98.48 | 0.998 | 159 | 2.00 | n.a. | 3000 | n.a. | n.a |
| Comp. 7 | 1.33 | 56.19 | 87.53 | 98.33 | 0.994 | 183 | 3.01 | n.a. | 2000 | n.a. | n.a. |
| Comp. 8 | 15.48 | 87.77 | 98.71 | 99.59 | 0.988 | 113 | 1.87 | n.a. | 200 | n.a. | n.a. |
| 9 | 10.8 | 59.18 | 84.97 | 97.8 | 0.995 | 157 | 1.78 | n.a. | 1500 | n.a. | n.a. |
| Comp. 10 | 16.02 | 75.84 | 94.94 | 99.19 | 0.998 | 125 | 1.72 | n.a. | 300 | n.a. | n.a. |
| 11 | 14.18 | 80.58 | 96.70 | 99.48 | 0.997 | 123 | 1.85 | n.a. | 300 | n.a. | n.a. |
| 12 | 13.82 | 76.69 | 95.01 | 99.41 | 0.999 | 127 | 1.83 | 2711 | 550 | 103 | 100 |
| 13 | 6.5 | 70.55 | 93.34 | 98.8 | 0.996 | 150 | 2.20 | 15049 | 2800 | 343 | 89 |
| Comp. 14 | 6.5 | 70.55 | 93.34 | 98.8 | 0.996 | 150 | 2.20 | 20336 | 3000 | 518 | 68 |
| Comp. 15 | 19.29 | 78.14 | 94.73 | 99.28 | 0.999 | 118 | 1.62 | 881 | 1200 | 121 | 100 |
| 16 | 20.86 | 78.73 | 95.20 | 99.32 | 0.998 | 115 | 1.58 | 5784 | 1200 | 100 | 100 |
| 17 | 4.56 | 72.78 | 92.45 | 99.30 | 0.996 | 154 | 2.44 | 18890 | 2500 | 256 | 88 |
| Comp. 18 | 18.43 | 75.83 | 95.82 | 99.33 | 0.995 | 119 | 1.66 | 0 | 600 | 114 | 99 |

*n.a. — not available

What is claimed is:

1. A fiber grade polyester resin having an intrinsic viscosity of at least about 0.8 dl/g measured in a 60/40 (w/w) mixture of phenol/tetrachloroethane at 25° C. and having a filter-blinding index less than about 10,000 Pa-cm$^2$/g measured at a throughput of 1.25 g/min of melt flow per cm$^2$ of filter area for 244 minutes at 300° C. through a 128×905 mesh/cm twilled Dutch weave screen having apertures less than 8 microns in dimension.

2. The polyester resin of claim 1 comprised of poly (ethylene terephthalate).

3. A method of preparing a fiber grade polyester resin comprising the steps of:
   (a) selecting a high purity terephthalic acid having a particle size distribution described by a Weibull function with an index of determination of 0.990 or greater, said distribution having a characteristic size from about 100 to about 140 micrometers and a shape factor from about 1.5 to about 2.1;
   (b) reacting the terephthalic acid with a glycol and polymerizing to form a linear polyester having an intrinsic viscosity of at least about 0.8 dl/g measured in a 60/40 (w/w) mixture of phenol/tetrachloroethane at 25° C.

4. A method of preparing a dimensionally stable polyester yarn at increased productivity and reduced fray count comprising the steps:
   a) selecting a high purity terephthalic acid having a particle size distribution described by a Weibull function with an index of determination of about 0.990 or greater, said distribution having a characteristic size from about 100 to about 140 micrometers and a shape factor from about 1.5 to about 2.1;
   b) reacting the terephthalic acid with a glycol and polymerizing to form a linear polyester having an intrinsic viscosity of at least about 0.8 dl/g measured in a 60/40 (w/w) mixture of phenol/tetrachloroethane at 25° C.;
   c) extruding the polyester through a shaped extrusion orifice having a plurality of openings to form a molten spun yarn;
   d) withdrawing and solidifying the molten spun yarn at sufficient speed to form a crystalline, partially oriented yarn; and
   e) hot drawing the yarn to a total draw ratio of about 1.5:1 to about 3:1.

5. The method of claim 3 or claim 4 wherein the terephthalic acid particle size distribution is described by a Weibull function with an index of determination of 0.995 or greater.

6. The method of claim 3 or claim 4 wherein the terephthalic acid particle size distribution has a characteristic size of from about 110 to about 125 micrometers.

7. The method of claim 3 or claim 4 wherein the terephthalic acid particle size distribution has a shape factor of from about 1.7 to about 1.9.

8. The method of claim 3 or claim 4 wherein the terephthalic acid contains less than about 25 parts per million of 4-carboxybenzaldehyde.

9. The method of claim 3 or claim 4 wherein the terephthalic acid contains less than about 10 parts per million of 4-carboxybenzaldehyde.

10. The method of claim 3 or claim 4 wherein the glycol is at least one member selected from the group consisting of ethylene glycol, propylene glycol, butylene glycol and trimethylene glycol.

11. The method of claim 3 or claim 4 wherein the glycol is ethylene glycol.

12. The method of claim 3 or claim 4 wherein the polymerization reaction occurs at least in part in the solid state.

13. The method of claim 3 or claim 4 wherein the polymerization reaction takes place in at least two stages and the final stage is in the solid state.

14. The method of claim 3 or claim 4 wherein the intrinsic viscosity of the linear polyester is at least about 0.9 dl/g.

15. The method of claim 3 or claim 4 wherein the intrinsic viscosity of the linear polyester is about 0.95 to about 1.5 dl/g.

16. The method of claim 3 or claim 4 wherein the intrinsic viscosity of the linear polyester is about 1.0 to about 1.25 dl/g.

17. The method of claim 3 or claim 4 wherein the linear polyester has a filter-blinding index less than about 10,000 Pa-cm$^2$/g measured at a throughput of 1.25 g/min of melt flow per cm$^2$ of filter area for 244 minutes at 300° C. through a 128×905 mesh/cm twilled Dutch weave screen having apertures less than 8 microns in dimension.

18. A fiber grade polyester resin having an intrinsic viscosity of at least about 0.8 dl/g measured in a 60/40 (w/w) mixture of phenol/tetrachloroethane at 25° C. and having a filter-blinding index less than about 10,000 Pa-cm$^2$/g measured at a throughput of 1.25 g/min of melt flow per cm$^2$ of filter area for 244 minutes at 300° C. through a 128×905 mesh/cm twilled Dutch weave screen having apertures less than 8 microns in dimension prepared by the process comprising the steps of:

(a) selecting a high purity terephthalic acid having a particle size distribution described by a Weibull function with an index of determination of 0.990 or greater, said distribution having a characteristic size from about 100 to about 140 micrometers and a shape factor from about 1.5 to about 2.1; and (b) reacting the terephthalic acid with a glycol and polymerizing to form a linear polyester having an intrinsic viscosity of at least about 0.8 dl/g.

19. A dimensionally stable polyester yarn prepared by the process comprising the steps of:

(a) selecting a high purity terephthalic acid having a particle size distribution described by a Weibull function with an index of determination of about 0.990 or greater, said distribution having a characteristic size from about 100 to about 140 micrometers and a shape factor from about 1.5 to about 2.1;

(b) reacting the terephthalic acid with a glycol and polymerizing to form a linear polyester having an intrinsic viscosity of at least about 0.8 dl/g measured in a 60/40 (w/w) mixture of phenol/tetrachloroethane at 25° C.;

(c) extruding the polyester through a shaped extrusion orifice having a plurality of openings to form a molten spun yarn;

(d) withdrawing and solidifying the molten spun yarn at sufficient speed to form a crystalline, partially oriented yarn; and (e) hot drawing the yarn to a total draw ratio of about 1.5:1 to about 3:1.

* * * * *